US007835127B2

(12) United States Patent
Yamashita

(10) Patent No.: US 7,835,127 B2
(45) Date of Patent: Nov. 16, 2010

(54) DRIVER DEVICE AND LIQUID DROPLET EJECTION HEAD

(75) Inventor: Toru Yamashita, Tokai (JP)

(73) Assignee: Brother Kogyo Kabushiki Kaisha, Nagoya-shi, Achi-ken (JP)

( * ) Notice: Subject to any disclaimer, the term of this patent is extended or adjusted under 35 U.S.C. 154(b) by 14 days.

(21) Appl. No.: 12/042,764

(22) Filed: Mar. 5, 2008

(65) Prior Publication Data

US 2008/0218558 A1 Sep. 11, 2008

(30) Foreign Application Priority Data

Mar. 8, 2007 (JP) ............................ 2007-058257

(51) Int. Cl.
*H02H 3/08* (2006.01)
*H02H 9/02* (2006.01)
*H02H 5/04* (2006.01)

(52) U.S. Cl. ...................... 361/93.1; 361/93.8; 361/103

(58) Field of Classification Search ................ 361/93.1, 361/93.8, 103

See application file for complete search history.

(56) References Cited

U.S. PATENT DOCUMENTS 5,754,205 A * 5/1998 Miyata et al. ................. 347/70
6,239,685 B1 * 5/2001 Albrecht et al. ............. 337/365
6,546,628 B2 * 4/2003 Silverbrook ............... 29/890.1
6,703,916 B2 * 3/2004 Charvet et al. .............. 337/141
7,084,762 B2 8/2006 Pedrazzini et al.
7,290,847 B2 11/2007 Shirotori et al.
7,473,859 B2 * 1/2009 Wright et al. ............... 200/181
7,542,250 B2 * 6/2009 Premerlani et al. ............. 361/2
2007/0132795 A1 * 6/2007 Han ............................. 347/9

FOREIGN PATENT DOCUMENTS

JP 2003-220743 A 8/2003
JP 2004-236306 A 8/2004
JP 2005-038921 A 2/2005
JP 2005-279784 * 10/2005

* cited by examiner

*Primary Examiner*—Stephen W Jackson
*Assistant Examiner*—Zeev Kitov
(74) *Attorney, Agent, or Firm*—Baker Botts, LLP.

(57) ABSTRACT

In a switch (mechanical switch) in a drive circuit, an electric potential according to the temperature of a driver IC is given to a gate electrode from a switch control circuit. During normal operation, a lever is in contact with terminals, and thus a terminal connected to an input terminal to which power is supplied from outside and a terminal connected to the drive circuit are connected to each other. On the other hand, when the electric potential given to the gate electrode is equal to or higher than a predetermined value, the lever is deformed due to electrostatic forces between the lever and the gate electrode and separates from the terminal, and thus the connection between the terminals is disconnected. The driver IC including the switch and the above-mentioned circuit is constructed as MEMS.

5 Claims, 8 Drawing Sheets

DRIVER DEVICE AND LIQUID DROPLET EJECTION HEAD

CROSS-REFERENCE TO RELATED APPLICATION

This non-provisional application claims priority under 35 U.S.C. §119(a) on Patent Application No. 2007-058257 filed in Japan on Mar. 8, 2007, the entire contents of which are hereby incorporated by reference.

TECHNICAL FIELD

The present invention relates to a driver device for driving an inkjet head and so on, and a liquid droplet ejection head including the driver device.

BACKGROUND

In a driver device like an IC chip for driving equipment such as an inkjet head, various electronic components are arranged at a high density, and therefore an unintended transistor (parasitic transistor) is sometimes formed between a plurality of components in the driver device. When such a parasitic transistor is formed, an overcurrent flows into the driver device due to the amplification function of the parasitic transistor (latch-up), and the driver device is overheating and, in the worst case, may start on fire.

In order to prevent such driver devices from overheating and staring on fire, some driver device includes therein a circuit (thermal shutdown circuit) for stopping the driver device when the temperature of the driver device becomes higher than a predetermined temperature. For example, in a power supply IC (driver device) disclosed in Japanese Patent Application Laid-Open No. 2005-38921, an Nch MOS transistor is connected to a thermal shutdown circuit composed of an NPN bipolar transistor, and a leakage current in the Nch MOS transistor increases with a rise in the temperature of the power supply IC. When the leakage current of the Nch MOS transistor equals or exceeds 1 μA, the thermal shutdown circuit is activated and the operation of the power supply IC is stopped.

SUMMARY

In the Japanese Patent Application Laid-Open No. 2005-38921, however, an electrical switch, such as an NPN bipolar transistor incorporated into the IC, is used as the thermal shutdown circuit. Therefore, if a parasitic transistor as mentioned above is formed between the NPN bipolar transistor and other component in the IC, there is a possibility that the NPN bipolar transistor may not work correctly and may be unable to stop the operation of the IC.

Hence, instead of providing such a thermal shutdown circuit in the IC, there is an option to provide a fuse and a relay separately from the IC. In this case, however, in addition to providing a fuse and a relay separately from the IC, it is necessary to provide a control circuit for controlling their operations, and it is also necessary to connect them together. Therefore, the driver device has a larger size as a whole and complicated structure.

Thus, it is an object to provide a driver device having small size and simple structure and capable of certainly preventing overheating and fire from occurring when an overcurrent flows, and to provide a liquid droplet ejection head including such a driver device.

A driver device according to a first aspect is a driver device comprising: a drive circuit; an input terminal to which power for activating said drive circuit is supplied from a power source; and a mechanical switch connected to said drive circuit and said input terminal and capable of switching connection and disconnection between said drive circuit and said input terminal, wherein said drive circuit, said input terminal and said mechanical switch are constructed as MEMS, and said mechanical switch switches from the connection to disconnection when an overcurrent flows into said drive circuit.

A liquid droplet ejection head according to a second aspect is a liquid droplet ejection head comprising; a channel unit having liquid channels including a plurality of nozzles for ejecting liquid droplets and a plurality of pressure chambers connected to said nozzles; a piezoelectric actuator, including a piezoelectric layer provided on a surface of said channel unit to cover said plurality of pressure chambers and a plurality of drive electrodes formed on a surface of said piezoelectric layer to correspond to said plurality of pressure chambers, for giving pressure for ejection to the liquid in said pressure chambers; and a driver device, mounted on an opposite surface of said piezoelectric layer to said pressure chambers, for driving said piezoelectric actuator, wherein said driver device comprises: a drive circuit, connected to said plurality of drive electrodes, for giving a driving potential for driving said piezoelectric actuator to said plurality of drive electrodes; an input terminal to which power for activating said drive circuit is supplied from a power source; and a mechanical switch connected to said drive circuit and said input terminal and capable of switching connection and disconnection between said drive circuit and said input terminal, wherein said drive circuit, said input terminal and said mechanical switch are constructed as MEMS, and said mechanical switch switches from the connection to disconnection when an overcurrent flows into said drive circuit.

According to the first and second aspects, when an overcurrent flows into a drive circuit, the connection between the drive circuit and an input terminal is disconnected by a mechanical switch and power is not supplied from the power source to the drive circuit. Consequently, since the overcurrent does not further flow in the drive circuit, it is possible to prevent the drive circuit from overheating and starting on fire.

Moreover, in the case where the connection and disconnection between the drive circuit and the input terminal are switched by an electrical switch such as a transistor, if a parasitic transistor is formed between the electrical switch and other component in the driver device, there is a possibility that the electrical switch may not work correctly and may be unable to stop the driver device. However, by switching the connection and disconnection between the drive circuit and the input terminal by the mechanical switch, it is possible to certainly disconnect the connection between the drive circuit and the input terminal when an overcurrent flows into the driver device.

By constructing the drive circuit, input terminal and mechanical switch as MEMS, it is possible to easily fabricate them, and it is possible to reduce the size of the mechanical switch. Additionally, since the drive circuit, input terminal and mechanical switch are provided on a single substrate as MEMS, it is possible to connect them on the substrate, thereby simplifying the structure of the driver IC. Here, MEMS is a system in which an electrical structure, such as a circuit, and a mechanical structure are both formed on a single substrate surface.

According to a second aspect, since the driver device is provided on the surface of a piezoelectric layer, it is possible to form wiring for connecting driving electrodes and the drive circuit on the surface of the piezoelectric layer. Thus, it is not necessary to provide expensive wiring members such as FPC or COF for connecting the driving electrodes and the drive circuit, and it is possible to reduce the manufacturing cost.

The above and further objects and features will more fully be apparent from the following detailed description with accompanying drawings.

DETAILED DESCRIPTION

The following description will explain a preferred embodiment. In the following explanation, the direction in which ink is ejected from nozzles onto recording paper is the downward direction and the opposite direction is the upward direction. The scanning direction of a carriage in FIG. 1 is the left-right direction.

Figure 1:
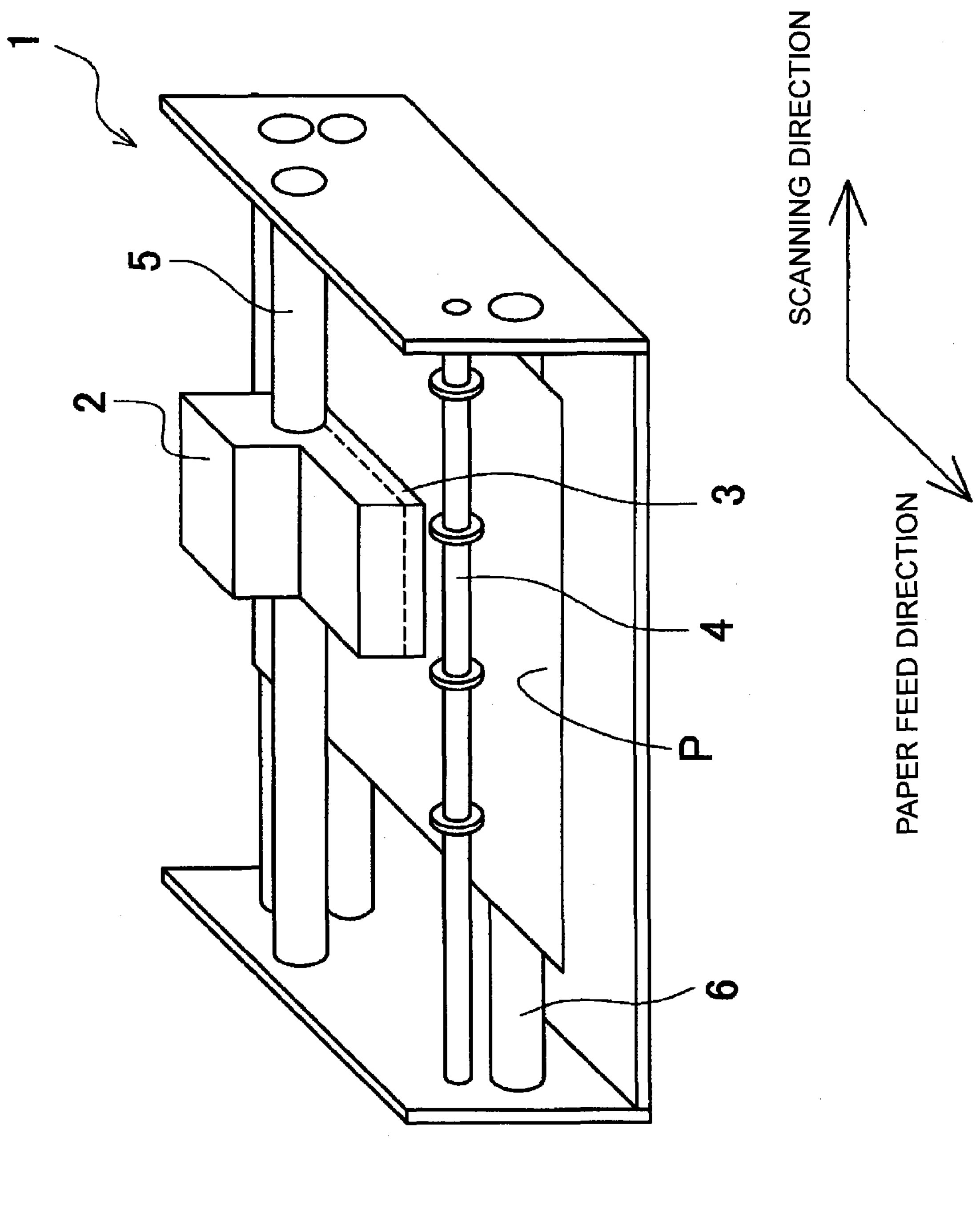
FIG. 1 is a schematic structural view of a printer according to an embodiment.

FIG. 1 is a schematic structural view of a printer according to this embodiment. As shown in FIG. 1, a printer 1 comprises a carriage 2, an inkjet head 3, and a paper feed roller 4.

The carriage 2 is a substantially box-shaped case made of resin, mounted movably on a guide shaft 5 extending in the left-right direction (scanning direction) in FIG. 1, and constructed to move reciprocally in the left-right direction (scanning direction) by a drive unit, not shown. An ink cartridge (not shown) containing a plurality of ink (for example, four colored ink of black, yellow, magenta, and cyan) is connected through ink tubes (not shown) to the inkjet head 3 mounted in the carriage 2. The paper feed roller 4 and a platen 6 are located under the carriage 2, and recording paper P is fed into the space between them in the frontward direction (paper feed direction) of FIG. 1. The inkjet head 3 is adhered and fixed to the lower surface of the carriage 2 and ejects the ink from a plurality of nozzles 16 (see FIG. 2) having openings exposed in the lower surface of the inkjet head 3 while moving reciprocally in the scanning direction together with the carriage 2 to perform printing on the recording paper P. Note that the recording paper P on which printing has been completed is discharged by the paper feed roller 4. Moreover, disposed in the carriage 2 is a head substrate 52 (see FIG. 5) which is electrically connected to the inkjet printer main body.

Figure 2:
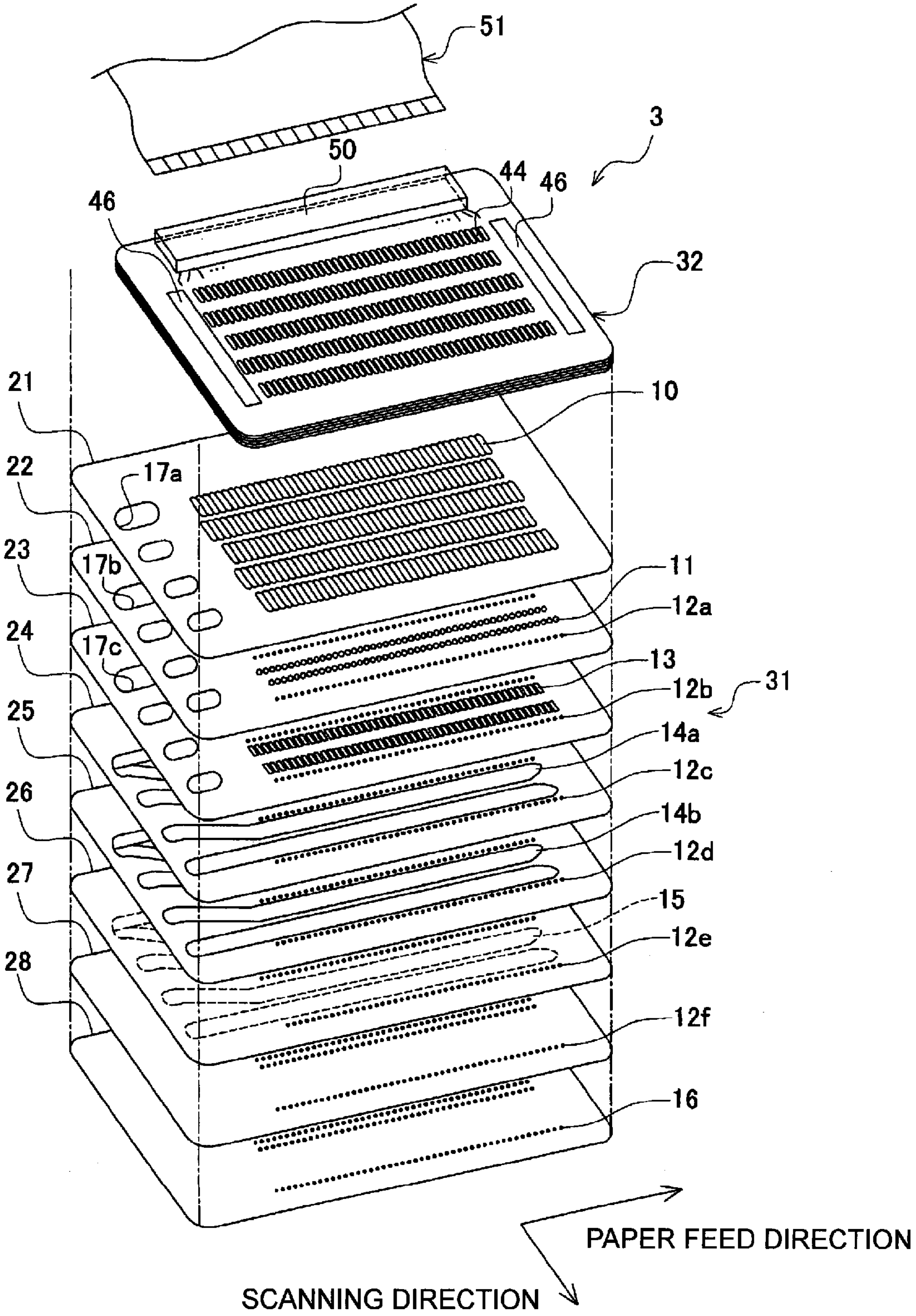
FIG. 2 is an exploded perspective view of an inkjet head in FIG. 1.
Figure 3:
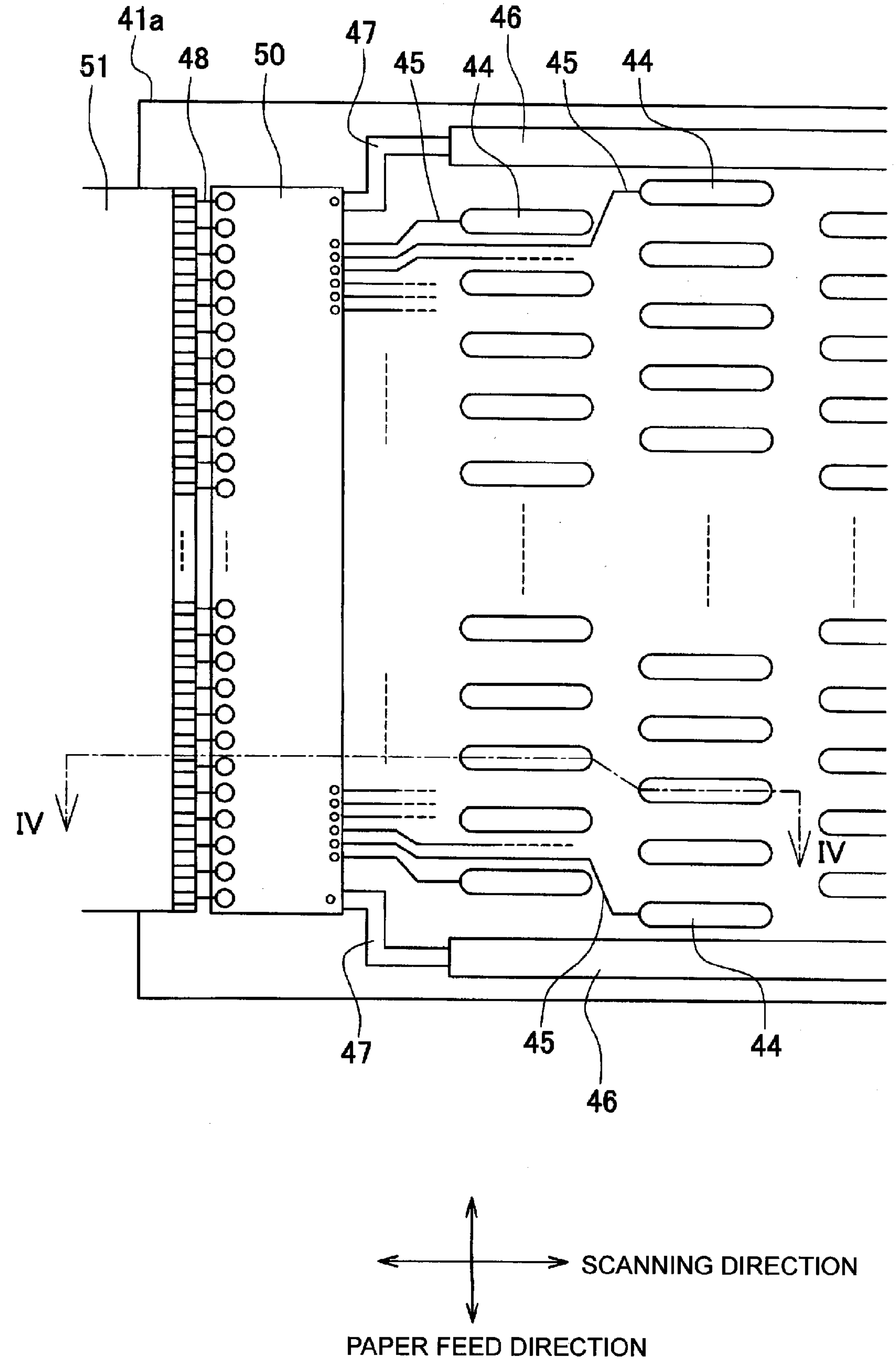
FIG. 3 is a plan view showing the inkjet head seen from the above.
Figure 4:
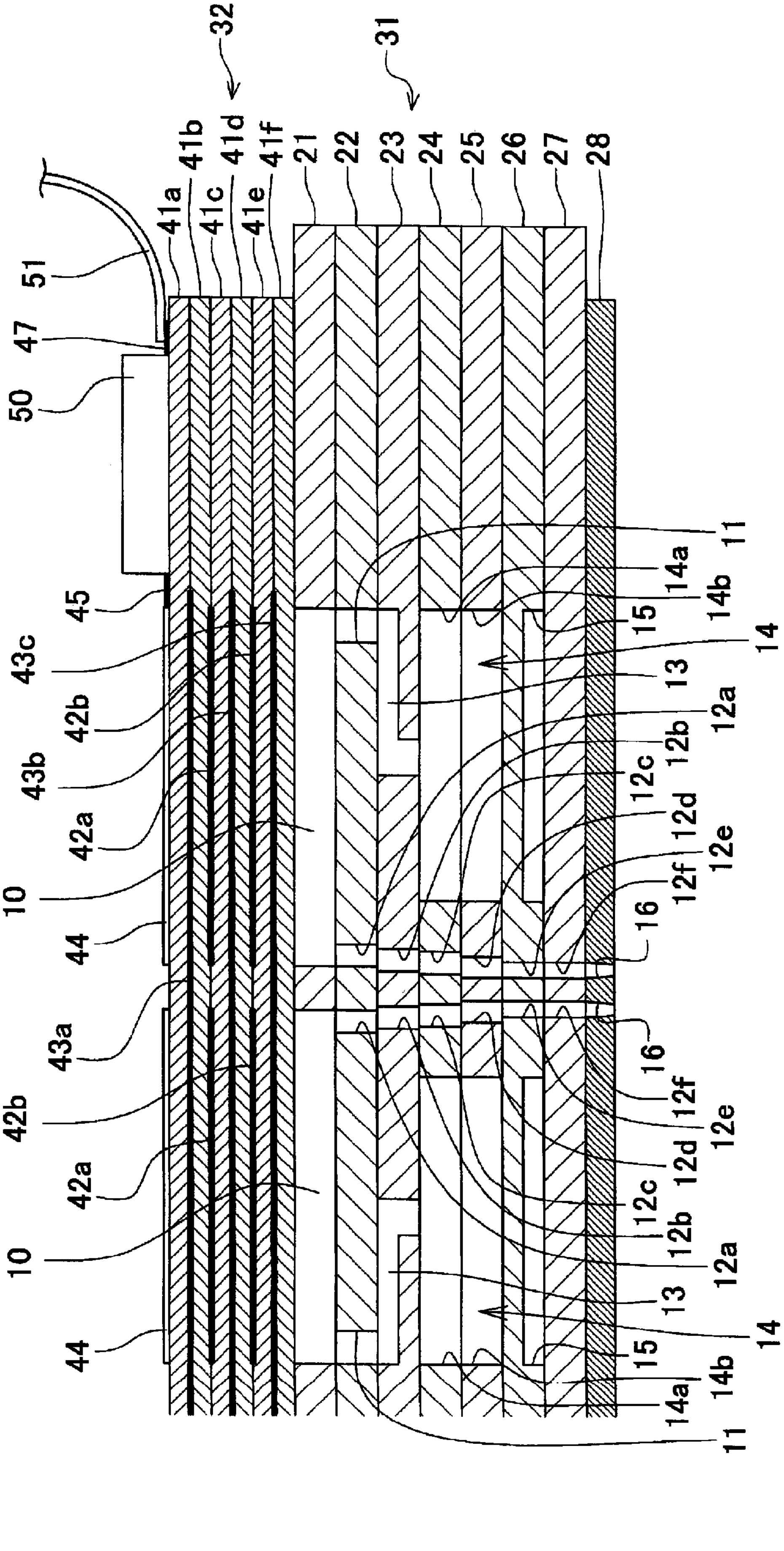
FIG. 4 is a cross sectional view taken along the IV-IV line in FIG. 3.

Next, the inkjet head 3 will be explained. FIG. 2 is an exploded perspective view of the inkjet head 3. FIG. 3 is a plan view of the inkjet head 3 seen from the above. FIG. 4 is a cross sectional view taken along the IV-IV line in FIG. 3.

As shown in FIGS. 2 to 4, the inkjet head 3 comprises a channel unit 31 in which a plurality of ink channels such as pressure chambers 10 are provided, and a piezoelectric actuator 32 arranged on the upper surface of the channel unit 31 for applying ejection pressure to the ink in the pressure chambers 10, the ink channel unit 31 and the piezoelectric actuator 32 being joined together. Mounted on the surface of the piezoelectric actuator 32 is a driver IC 50 (driver device) for applying a driving potential for selectively driving the piezoelectric actuator 32 according to print data sent from the main body. The driver IC 50 is connected through an FFC (flexible flat cable) 51 to the head substrate 52 mounted in the carriage 2.

The channel unit 31 comprises a laminated stack of eight plates including a cavity plate 21, a base plate 22, an aperture plate 23, two manifold plates 24 and 25, a dumper plate 26, a cover plate 27 and a nozzle plate 28 which are joined together with an adhesive. Among the eight plates 21 to 28, seven plates 21 to 27 other than the nozzle plate 28 are fabricated with metal materials, such as a stainless plate and a nickel alloy steel plate, and the nozzle plate 28 is fabricated with a synthetic resin material such as polyimide.

The ink channels provided in the channel unit 31 are constructed so that the ink supplied from the ink cartridge is reserved in manifold channels 14*a* and 14*b* (or collectively referred to as the manifold channels 14) provided in the manifold plates 24 and 25, respectively, through ink supply ports 17*a* to 17*c* (or collectively referred to as the ink supply ports 17) formed in the cavity plate 21, the base plate 22, and the aperture plate 23, respectively, and then the ink is supplied to a plurality of pressure chambers 10 provided in the cavity plate 21 through apertures 13 formed in the aperture plate 23 connected to the manifold channels 14 and through-holes 11 formed in the base plate 22. The respective pressure chambers 10 are connected to a plurality of nozzles 16 provided in the nozzle plate 28 via through-holes 12*a* to 12*f* formed in the base plate 22, aperture plate 23, manifold plates 24 and 25, dumper plate 26 and cover plate 27, respectively. In other words, when the piezoelectric actuator 32 gives pressure selectively to the pressure chamber 10, the ink filling each ink channel in the channel unit 31 flows from the outlet of the manifold channel 14 through the pressure chamber 10 to the nozzle 16 and is then ejected. The details will be explained next.

In the nozzle plate 28 as the lowest layer in the channel unit 31, a plurality of nozzles 16 for ejecting the ink are formed by making holes in the paper feeding direction so that they are arranged in five lines in the scanning direction. The reason why five lines of nozzles 16 are arranged for four colored ink is because two lines of the nozzles 16 are arranged for ejecting black ink which is used highly frequently.

In the cavity plate 21 as the topmost layer, a plurality of pressure chambers 10 going through the plate thickness are provided in the paper feeding direction, and five lines of such pressure chambers 10 are arranged in the scanning direction. The pressure chamber 10 has an elongated shape when seen in the plan view with its longitudinal direction running in the scanning direction, and has one end connected to the through-hole 11 and the other end connected to the nozzle 16. On one end (the left end in FIG. 2) of the cavity plate 21 in the paper feed direction, four ink supply ports 17*a* for supplying a plurality of colored (four colored) ink from the ink cartridge to the manifold channels 14 are arranged in the scanning direction.

In the base plate 22, the through-holes 11 and 12*a* are provided at positions overlapping both ends in the longitudinal direction of the pressure chamber 10 when seen in the plan view. Moreover, an ink supply port 17*b* is formed to go through the base plate 22 at a position overlapping the ink supply port 17*a* when seen in the plan view.

The aperture plate 23 is provided with an aperture 13 as a diaphragm extending in the scanning direction from a position overlapping the through-hole 11 when seen in the plan view to substantially the center of the pressure chamber 10 in the longitudinal direction. Further, a through-hole 12*b* and an ink supply port 17*c* are formed to go through the aperture plate 23 at positions overlapping the through-hole 12*a* and the ink supply port 17*b*, respectively, when seen in the plan view.

In the manifold plates 24 and 25, five manifold channels 14*a* and 14*b* running in the paper feed direction to correspond to the five lines of the pressure chambers 10 provided in the cavity plate 10 and overlapping the pressure chambers 10 in the longitudinal direction when seen in the plan view are provided so that they face each other and go through the manifold plates 24 and 25. One end of each of the manifold channels 14*a* and 14*b* is extended to a position so that it is connected to the ink supply port 17. The manifold channels 14*a* and 14*b* are formed by placing the aperture plate 23 and the dumper plate 26 on the manifold plates 24 and 25 and joining them together. The ink supplied to the ink supply port 17 is reserved in the manifold channel 14. Through-holes 12*c* and 12*d* are formed in the manifold plates 24 and 25, respectively, at positions overlapping the through-holes 12*b* when seen in the plan view. The reason why five manifold channels 14 are arranged for four ink supply ports 17 for supplying four colored ink is because two manifold channels 14 are provided for the ink supply port 17 for supplying black ink which is used highly frequently.

In the dumper plate 26, five recessed sections 15 formed by half-etching the lower surface of the dumper plate 26 are provided at positions overlapping the manifold channels 14 when seen in the plan view. The dumper plate 26 is thinner in the part where the recessed sections 15 are formed. As to be described later, a pressure wave which is created in the pressure chamber 10 when ejecting the ink from the nozzle 16 by driving the piezoelectric actuator 32 and reaches the manifold channel 14 is attenuated with oscillation of the thinner part of the dumper plate 26 where the recessed section 15 is formed. Thus, it is possible to prevent so-called crosstalk in which the characteristic of ejecting ink from the nozzle 16 changes due to the pressure wave. Further, in the dumper plate 26, a through-hole 12*e* is formed at a position overlapping the through-hole 12*d* when seen in the plan view.

In the cover plate 27, a through-hole 12*f* connected to the through-hole 12*e* and the nozzle 16 is formed at a position overlapping the through-hole 12*e* and the nozzle 16 when seen in the plan view.

Next, the piezoelectric actuator 32 will be explained. The piezoelectric actuator 32 includes piezoelectric layers 41*a* to 41*f*, individual electrodes 42*a* and 42*b* (or collectively referred to as the individual electrodes 42), surface individual electrodes 44, common electrodes 43*a* to 43*c* (or collectively referred to as the common electrodes 43), and surface common electrodes 46.

The piezoelectric layers 41*a* to 41*f* are in the shape of a flat plate having a size of all the pressure chambers 10, placed one upon the other in the same direction as the direction in which a plurality of plates 21 to 28 are placed one upon the other, and disposed on the upper surface of the channel unit 31 to cover the pressure chambers 10. The piezoelectric layers 41*a* to 41*f* are fabricated with piezoelectric material composed mainly of ferroelectric lead zirconate titanate which is, for example, mixed crystals of lead titanate and lead zirconate (ternary metal oxides). Moreover, the piezoelectric layers 41*a* to 41*f* are polarized in the thickness direction beforehand.

The individual electrodes 42*a* and 42*b* are provided between the piezoelectric layers 41*b* and 41*c*, and between the piezoelectric layers 41*d* and 41*e*, respectively. The individual electrodes 42*a* and 42*b* are arranged in the paper feed direction to correspond to a plurality of pressure chambers 10, so that five lines of the individual electrodes 42*a* and 42*b* are arranged in the scanning direction. Each of the individual electrodes 42*a* and 42*b* has an elongated shape slightly smaller than the pressure chamber 10 when seen in the plan view, and is placed at a position overlapping substantially the center of the pressure chamber 10 when seen in the plan view. On the topmost piezoelectric layer 41*a*, the surface individual electrodes 44 are disposed at positions overlapping the individual electrodes 42 when seen in the plan view so that the surface individual electrodes 44 and the individual electrodes 42*a* and 42*b* are connected to each other via through-holes (not shown) formed in the piezoelectric layers 41*a* to 41*f*. A driving potential is given to the surface individual electrodes 44 by the driver IC 50, and a driving potential is also given to the individual electrodes 42*a* and 42*b*. Note that the individual electrodes 42*a* and 42*b* and the surface individual electrodes 44 are equivalent to drive electrodes.

The common electrodes 43*a* to 43*c* are provided between the piezoelectric layers 41*a* and 41*b*, between the piezoelectric layers 41*c* and 41*d*, and between the piezoelectric layers 41*e* and 41*f*, respectively, over the almost entire surface area of the piezoelectric layers 41*a* to 41*f*. On the topmost piezoelectric layer 41*a*, the surface common electrodes 46 are placed near both ends in the paper feed direction, and the common electrodes 43*a* to 43*c* and the surface common electrodes 46 are connected to each other via through-holes (not shown) similarly to the individual electrodes 42. The common electrodes 43 are always held at ground potential by the driver IC 50, and the surface common electrodes 46 are also held at ground potential all the time.

As shown in FIGS. 2 to 4, the driver IC 50 is mounted near one end in the scanning direction of the topmost piezoelectric layer 41*a* of the piezoelectric actuator 32. On the output side of the driver IC 50 (the right side of the driver IC 50 in FIG. 3), the surface individual electrodes 44 and the surface common electrode 46 are connected to the driver IC 50 through wires 45 and 47 formed on the upper surface of the piezoelectric layer 41*a*. Moreover, on the input side of the driver IC 50 (the left side of the driver IC 50 in FIG. 3), the flexible flat cable (FFC) 51 is connected to the driver IC 50 through wires 48 formed on the upper surface of the piezoelectric layer 41*a*, so that the driver IC 50 is electrically connected to the main body. Since the driver IC 50 is connected with the surface electrodes 44 and 46 formed on the upper surface of the piezoelectric layer 41*a* through the wires 45 and 47, conventional expensive components such as FPC and COF are not necessary, thereby enabling a reduction in the manufacturing cost. On the other hand, the input side of the driver IC 50 is connected to a later-described head substrate 52 through the inexpensive general FFC as a connection member.

In the piezoelectric actuator 32, when a driving potential is given to the individual electrode 42 from the driver IC 50 through the surface individual electrode 44, a potential difference is produced between the individual electrode 42 and the common electrode 43, and an electric field is generated in the thickness direction at the part of the piezoelectric layer between the two electrodes 42 and 43. Since the direction of the electric field is parallel to the polarization direction of the piezoelectric layers 41*a* to 41*e*, the piezoelectric layers 41*a* to 41*e* are extended in the thickness direction by the piezoelectric longitudinal effect. Consequently, the piezoelectric layer 41*f* is pushed by the piezoelectric layers 41*a* to 41*e* extended in the thickness direction, and deformed to protrude toward the pressure chamber 10. Therefore, the capacity of the pressure chamber 10 becomes smaller, the pressure of the ink in the pressure chamber 10 increases, a pressure wave is created, and the ink is ejected from the nozzle 16 connected to the pressure chamber 10.

Figure 5:
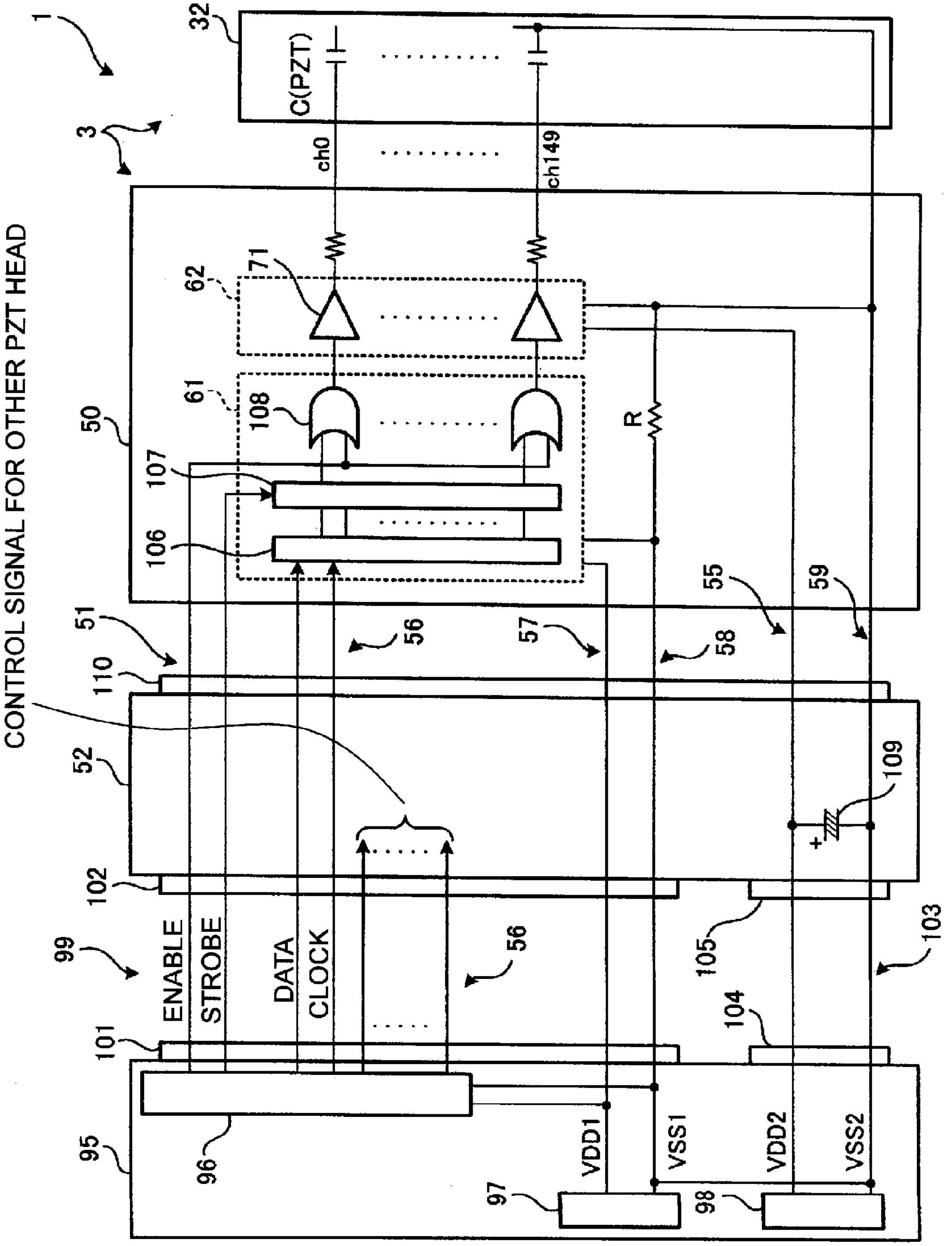
FIG. 5 is a view showing an electrical structure of an inkjet head printer.
Figure 6:
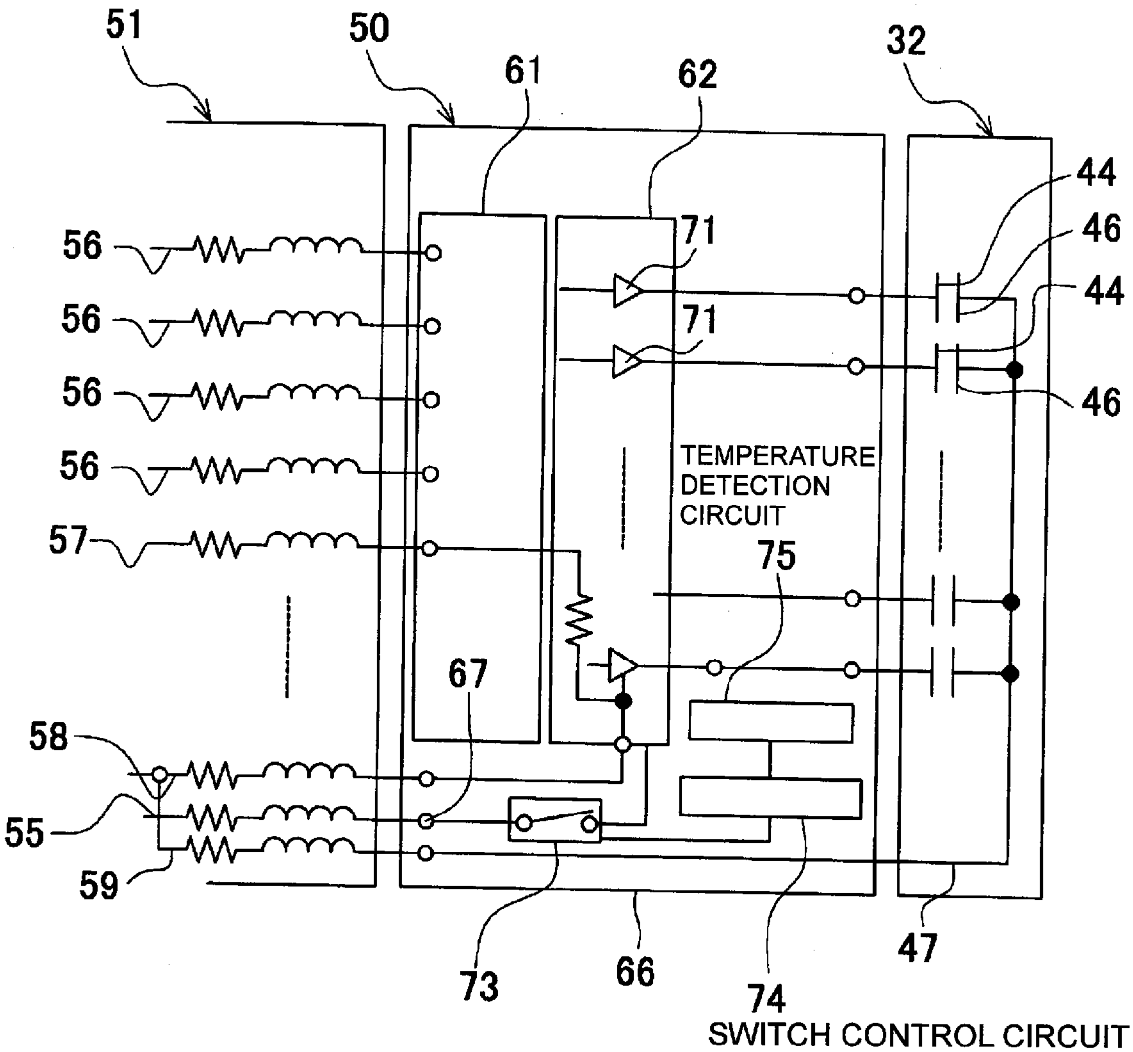
FIG. 6 is a view showing electrical structures of a piezoelectric actuator and a driver IC.
Figure 7A:
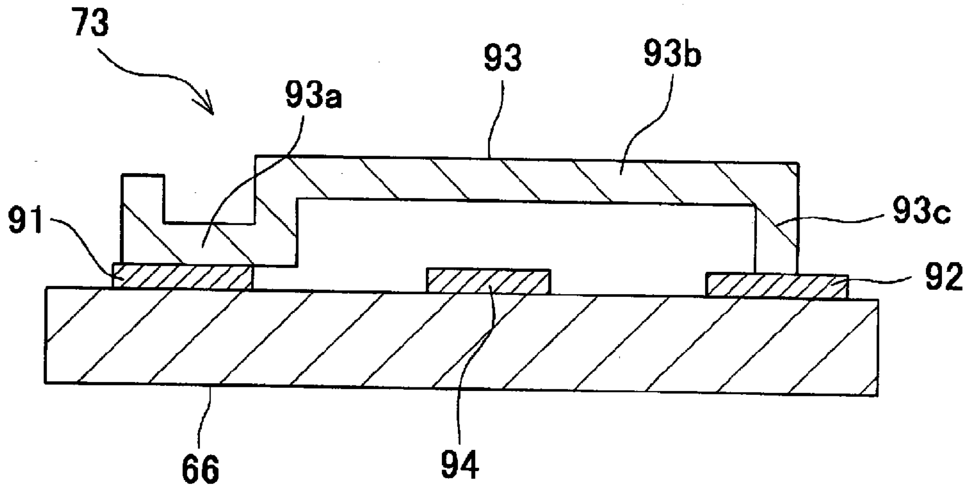
FIG. 7A is a cross sectional view showing the contact state of a switch in FIG. 6.
Figure 7B:
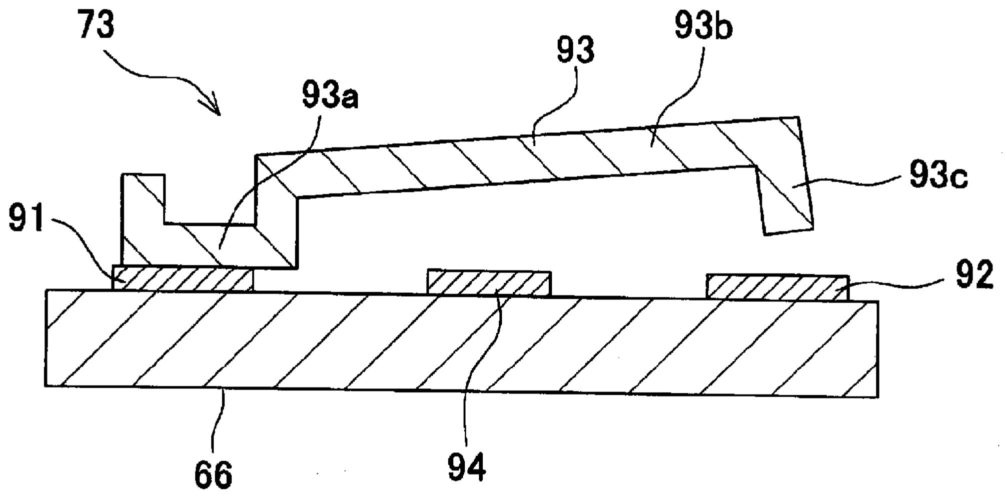
FIG. 7B is a cross sectional view showing the separated state of the switch in FIG. 6.
Figure 8A:
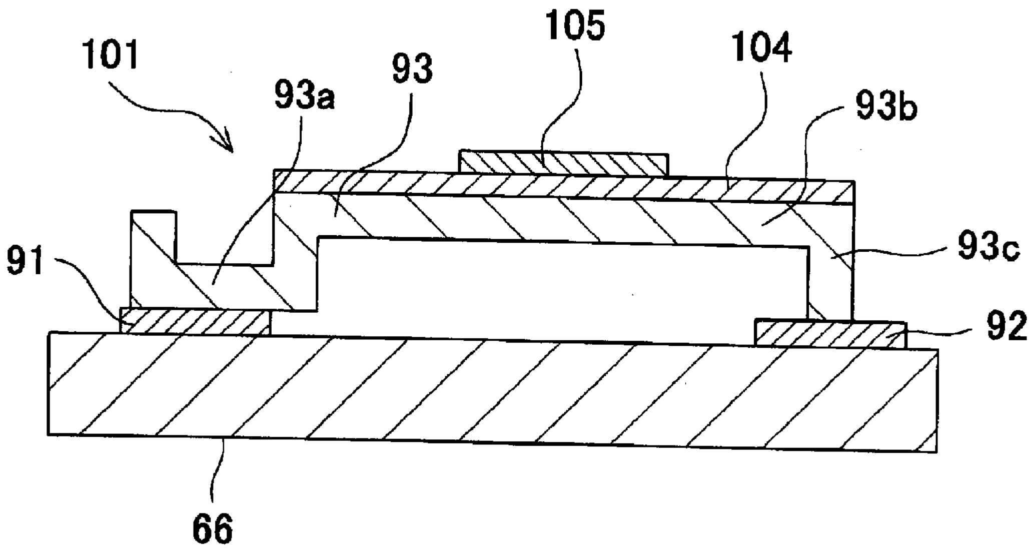
FIGS. 8A and 8B are cross sectional views of Modified Example 1 corresponding to FIGS. 7A and 7B.
Figure 8B:
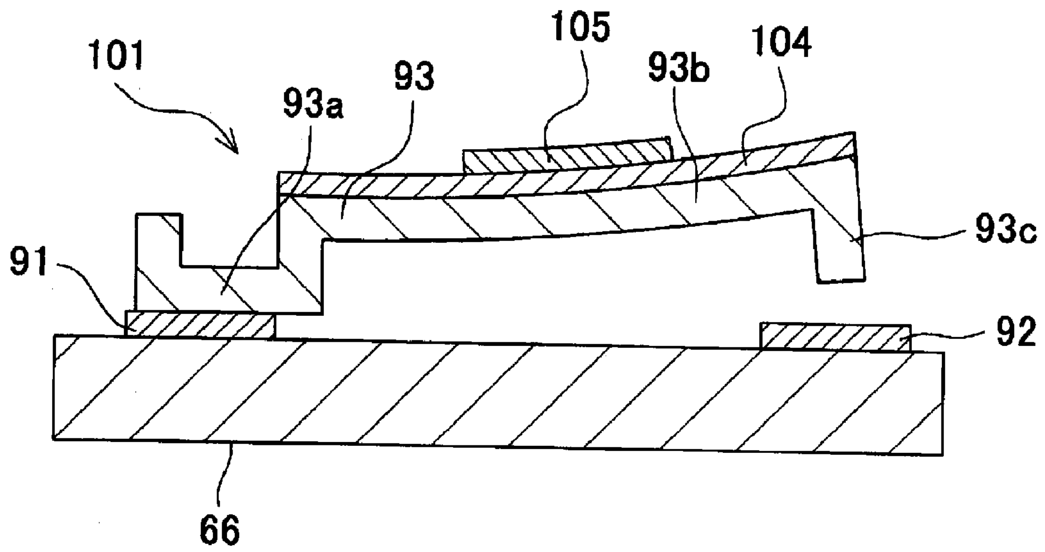

Next, the electrical structure of an inkjet printer will be explained. FIG. 5 is a schematic view showing the electrical structure of the inkjet head printer, and FIG. 6 is a schematic view showing the detailed connection between the piezoelectric actuator 32 and the driver IC 50. FIG. 7A and 7B are plan views showing the detail of a switch 73 in FIG. 6. FIGS. 8A and 8B are cross sectional views of Modified Example 1 corresponding to FIGS. 7A and 7B.

In an inkjet printer 1, as shown in FIG. 5, the main body substrate 95, the head substrate 52, the driver IC 50 and the piezoelectric actuator 32 are connected to each other. Mounted on the main body substrate 95 are a main body control circuit 96, a control signal power source 97, and a drive pulse power source 98. The main body substrate 95 is mounted in the housing of the inkjet printer outside the carriage 2, and the head substrate 52 is mounted in the carriage 2 together with the driver IC 50 and the piezoelectric actuator 32. As to be described later, a control circuit 61, a drive circuit 62 and a switch 73 are mounted on the driver IC 50.

The main body control circuit 96 is connected to the control circuit 61 through a control signal line 56, and outputs to the control circuit 61 control signals, such as an enable signal, a data signal, a clock signal, and a strobe signal, according to predetermined print data. The control signal power source 97 is connected to the control circuit 61 through a drive VDD1 line 57 for applying a drive voltage and a ground VSS1 line 58, and applies a voltage (for example, 5 volt) to the control circuit 61.

The drive pulse power source 98 is connected to the drive circuit 62 through a drive VDD2 line 55 for applying a drive voltage and a ground VSS2 line 59, and applies a voltage (for example, 16 volt) to the drive circuit 62.

More specifically, as shown in FIG. 5, the main body substrate 95 and the head substrate 52 are connected together by connecting the respective ends of a flexible flat cable 99, including the drive VDD1 line 57, ground VSS1 line 58 and control signal line 56 arranged horizontally in the width direction, to a connector 101 provided on the main body substrate 95 and a connector 102 attached to the head substrate 52. The main body substrate 95 and the head substrate 52 are also connected by connecting the respective ends of a flexible flat cable 103, including the drive VDD2 line 55 and ground VSS2 line 59 arranged horizontally in the width direction, to a connector 104 provided on the main body substrate 95 and a connector 105 attached to the head substrate 52.

Further, the head substrate 52 and the driver IC 50 are connected together by connecting one end of the flexible flat cable 51, including the control signal line 56, drive VDD1 line 57, ground VSS1 line 58, drive VDD2 line 55 and ground VSS2 line 59 arranged horizontally in the width direction, to the input side of the driver IC 50 through the wire 48 and connecting the other end to a connector 110 provided on the head substrate 52. The output side of the driver IC 50 is connected through the wires 45 and 47 to the respective surface electrodes 44 and 46 of the piezoelectric actuator 32 as described above. Note that the drive VDD1 line 57, ground VSS1 line 58 and ground VSS2 line 59 are connected to each other and held at the ground potential. Thus, a reference electric potential (a common potential, or a ground potential in this embodiment) in the control circuit 61, drive circuit 62 and piezoelectric actuator 32 is defined. The ground VSS2 line 59 is also connected to the surface common electrode 46 of the piezoelectric actuator 32. Moreover, a branch line of the ground VSS2 line 59 and the ground VSS1 line 58 are connected to each other through a resistor R, and the drive circuit 62 and the control circuit 61 are held at the same electric potential.

On the head substrate 52, an electrolytic capacitor 109 is bypass-connected to the drive VDD2 line 55 and the ground VSS2 line and stores charges to be supplied to the control signal power source 97 to prevent voltage drop in the drive pulse supply 98 when a large current flows momentarily into the control signal power source 97.

The control circuit 61 generates control signals (drive instruction signals) corresponding to the respective drive elements, based on control signals such as print data from the main body control circuit 96, and includes a shift resistor 106, a D flip-flop 107 and an OR gate 108 which are connected to each other. A number of shift resistors 106, D flip-flops 107 and OR gates 108 corresponding to the number of the nozzles 16 are provided (for example, if the number of the nozzles 16 are 150, 150 shift resistors 106 and so on are provided). Among the control signals transmitted from the main body control circuit 96 through the control signal line 56, the data signal and clock signal are outputted in a synchronous manner to the shift resistor 106, the strobe signal is outputted to the D flip-flop 107, and the enable signal is outputted to the OR gate 108. The data signal and the clock signal are outputted to the drive circuit 62 separately via a driving potential line for converting the drive instruction signal into drive power suitable for the piezoelectric actuator 32 in the drive circuit 62, and a channel selection line for determining a nozzle 16 (channel) from which the ink is to be ejected.

The drive circuit 62 generates drive power for driving the piezoelectric actuator 32 based on the control signals outputted from the control circuit 61. In the drive circuit 62, the same number of drivers 71 (drive power supply circuits) as the number of the nozzles 16 are provided (for example, 150 drivers 71 are provided for 150 nozzles 16). The input terminal of the driver 71 is connected to the OR gate 108, and the output terminal is connected to the surface common electrode 46 and surface individual electrode 44 of the actuator 32.

Moreover, in the driver IC 50, a switch 73, a switch control circuit 74 and a temperature detection circuit 75 are provided at some points of the drive VDD2 line 55 connected to the drive circuit 62, and thus power is supplied to an input terminal 67 connected to the drive circuit 62 through the switch 73 and then the power is supplied to the drive circuit 62.

The driver IC 50 will be explained using FIGS. 2 to 7A and 7B. FIG. 6 is a view showing the electrical structures of the piezoelectric actuator 32 and the driver IC 50. FIGS. 7A and 7B are cross sectional views showing the structure of the switch 73 (mechanical switch) in FIG. 6.

The driver IC 50 is made from silicon material, etc., and comprises the control circuit 61, drive circuit 62, switch 73, switch control circuit 74 and temperature detection circuit 75 provided on the surface of a substrate 66 that is a plate member having a substantially rectangular shape when seen in the plan view as MEMS (Micro Electro Mechanical System). The substrate 66 is mounted on the upper surface of the piezoelectric layer 41*a*. Here, MEMS is a system in which electrical structures, such as circuits, and a mechanical structure are both formed on the surface of a single substrate. As MEMS, since the control circuit 61, drive circuit 62, switch control circuit 74 and temperature detection circuit 75 as electrical structures and the switch 73 as a mechanical structure are both provided on a single substrate 66, it is possible to reduce the size of the driver IC 50. Moreover, since the control circuit 61, drive circuit 62, switch 73, switch control circuit 74 and temperature detection circuit 75 are formed on a single substrate 66 as MEMS, it is possible to connect them on the substrate 66, thereby simplifying the structure of the driver IC 50.

The control circuit 61 outputs a signal (drive instruction signal) instructing the driver 71 of the drive circuit 62 to give a driving potential to the surface individual electrode 44, based on print data inputted from outside through the control signal line 56.

The drive circuit 62 includes a plurality of drivers 71 corresponding to a plurality of surface individual electrodes 44, and each driver 71 gives a driving potential to a corresponding surface individual electrode 44 when a drive instruction signal is inputted from the control circuit 61.

As shown in FIGS. 7A and 7B, the switch 73 has terminals 91 and 92, a lever 93, and a gate electrode 94. The terminal 91 (first terminal) is formed on the upper surface of the substrate 66 and connected to the input terminal 67 of the VDD2 line 55. The terminal 92 (second terminal) is formed on the upper surface of the substrate 66 and connected to the drive circuit 62 through the VDD2 line 55 and connected to a corresponding surface individual electrode 44 through the wire 45.

The gate electrode 94 is made of polysilicon, for example, and the terminals 91 and 92 and the lever 93 are made of conducting materials such as Cu, Ni, and an alloy of Cu and Zn. The lever 93 includes a flat end section 93*a* with a left end lower surface connected to the upper surface of the terminal 91; an extended section 93*b* extended upward from the flat end section 93*a*, bent to the right in the middle in FIGS. 7A to 8B and extended to a position facing the terminal 92; and a contact section 93*c* which is bent down from the extended section 93*b* to the terminal 92 and selectively comes into contact with the terminal 92. The gate electrode 94 is arranged to face the lever 93 with a space therebetween near substantially the middle between the terminals 91 and 92 on the upper surface of the substrate 66, and connected to the switch control circuit 74.

In the switch 73, when an electric potential is given as a control signal to the gate electrode 94 from the switch control circuit 74 as to be described later, electrostatic forces are generated between the lever 93 and the gate electrode 94 in the direction away from each other according to the given electric potential. The greater the value of the electric potential given to the gate electrode 94, the stronger the electrostatic forces generated between the lever 93 and the gate electrode 94.

Therefore, when the value of the electric potential given to the gate electrode 94 is smaller than a predetermined value, the electrostatic forces between the lever 93 and the gate electrode 94 are smaller, and the contact section 93*c* of the lever 93 and the terminal 92 are in contact with each other (in the contact state) as shown in FIG. 7A. In this state, since the terminal 91 and the terminal 92 are connected, the input terminal 67 and the drive circuit 62 are connected. At this time, power is supplied from an external power source to the driver 71 of the drive circuit 62.

On the other hand, when the value of electric potential given to the gate electrode 94 is equal to or higher than the predetermined value (when a control signal corresponding to the driver IC 50 with temperature equal to or higher than a predetermined temperature is inputted), the lever 93 is deformed and the contact section 93*c* of the lever 93 separates from the terminal 92 as shown in FIG. 7B due to the electrostatic forces between the lever 93 and the gate electrode 94. In short, the lower surface of the contact section 93*c* of the lever 93 and the upper surface of the terminal 92 are separated (in the separated state). In this state, the connection between the input terminal 67 and the drive circuit 62 is disconnected, and power is not supplied from the external power source to the driver 71.

The temperature detection circuit 75 detects the temperature of the driver IC 50, and outputs a higher electric potential to the switch control circuit 74 as the temperature of the driver IC 50 is higher. In other words, the temperature detection circuit 75 outputs to the switch control circuit 74 an electric potential (temperature instructing electric potential) according to the temperature of the driver IC 50. The switch control circuit 74 amplifies the temperature instructing electric potential inputted from the temperature detection circuit 75 by a predetermined factor and gives the amplified electric potential to the gate electrode 94 (outputs a control signal to the gate electrode 94).

In such a driver IC 50, the temperature detection circuit 75 outputs the temperature instructing electric potential to the switch control circuit 74, and then the switch control circuit 74 amplifies the temperature instructing electric potential inputted from the temperature detection circuit 75 and gives it to the gate electrode 94. Since the electric potential given to the gate electrode 94 is low and the electrostatic forces between the lever 93 and the gate electrode 94 are small during normal operation, the lever 93 and the terminal 92 are in contact with each other as described above. At this time, the input terminal 67 and the drive circuit 62 are connected, and power is supplied from the external power source to the drive circuit 62.

On the other hand, when an overcurrent flows to the driver IC 50, the temperature of the driver IC 50 increases. When the driver IC 50 equals or exceeds a predetermined temperature, the value of electric potential given to the gate electrode 94 is equal to or higher than a predetermined value. Consequently, as described above, the terminal 92 and the lever 93 are separated from each other by the electrostatic forces between the lever 93 and the gate electrode 94. At this time, the connection between the input terminal 67 and the drive circuit 62 is disconnected, and power is not supplied from the external power source to the drive circuit 62. Accordingly, since the overcurrent is not further supplied to the driver IC 50, it is possible to prevent the driver IC 50 from overheating and starting on fire.

Here, it is also possible to incorporate an electrical switch, such as a transistor in the driver IC 50, instead of the switch 73 that is a mechanical switch to connect and disconnect the drive circuit 62 and the input terminal 67 by this electrical switch. In this case, however, if a parasitic transistor is formed between the electrical switch and other electronic component of the driver IC 50, there is a possibility that the electrical switch may not operate correctly and the connection between the drive circuit 62 and the input terminal 67 may not be disconnected. In this embodiment, however, since the connection and switching between the drive circuit 62 and the input terminal 67 is implemented by the switch 73 as a mechanical switch, the connection between them is certainly disconnected when the temperature of the driver IC 50 equals or exceeds a predetermined temperature.

Moreover, it is possible to provide a fuse and a relay separately from the driver IC 50 between the external power source and the input terminal 67, instead of providing the driver IC 50 with the switch 73, and switch the connection and disconnection between the external power source and the input terminal 67 by the fuse and relay when an overcurrent flows into the driver IC 50. In this case, however, it is necessary to provide the fuse and relay separately from the driver IC 50, and it is also necessary to provide a circuit for controlling their operations. Further, since the fuse and relay need to be connected to each other, the wiring becomes complicated. Consequently, the printer 1 has a larger size and complicated structures.

On the other hand, in this embodiment, the control circuit 61, drive circuit 62, switch 73, switch control circuit 74 and temperature detection circuit 75 are provided on the surface of the substrate 66 as MEMS, and they are connected on the substrate 66. Therefore, as described above, it is possible to reduce the size of the driver IC 50, and the structure of the driver IC 50 is simplified.

According to the above-explained embodiment, when an overcurrent flows into the drive circuit 62 and the temperature of the drive circuit 62 equals or exceeds a predetermined temperature, power is not supplied to the drive circuit 62. Hence, the overcurrent does not further flow into the driver IC 50, thereby preventing the drive circuit 62 from overheating and staring on fire.

Further, since the connection and disconnection between the drive circuit 62 and the input terminal 67 are switched by the switch 73 as a mechanical switch, it is possible to certainly disconnect the connection between the drive circuit 62 and the input terminal 67 when an overcurrent flows into the driver IC 50.

By constructing the driver IC 50 as MEMS, it is possible to easily form the drive IC 50 and it is possible to reduce the size of the switch 73.

Moreover, as shown in FIGS. 7A and 7B, by constructing the switch 73 including the terminals 91 and 92, lever 93 and gate electrode 94, it is possible to simplify the structure of the switch 73. By giving an electric potential according to the temperature of the driver IC 50 to the gate electrode 94 from the switch control circuit 74, it is possible to easily disconnect the connection between the drive circuit 62 and the input terminal 67.

Further, since the driver IC 50 is arranged on the upper surface of the piezoelectric layer 41*a*, it is possible to form the wires 45 and 47 for connecting the surface electrodes 44, 46 and the driver IC 50 on the upper surface of the piezoelectric layer 41*a*. Therefore, it is not necessary to use expensive wiring members such as FPC and COF, and it is possible to reduce the manufacturing cost.

In this embodiment, although the switch control circuit 74 amplifies the electric potential inputted from the temperature detection circuit 75 by a predetermined factor and outputs the amplified electric potential to the gate electrode 94, the present invention is not limited to this. For example, it may be possible to configure the switch control circuit 74 so that the electric potential is not given to the gate electrode 94 when the electric potential inputted from the temperature detection circuit 75 is lower than the predetermined value, and the electric potential is given to the gate electrode 94 only when the electric potential inputted from the temperature detection circuit 75 is equal to or higher than the predetermined value. Note that the electric potential given to the gate electrode 94 at this time is an electric potential which is just enough to produce electrostatic forces between the lever 93 and the gate electrode 94 to separate the lever 93 from the terminal 92.

In this case, when the temperature detected by the temperature detection circuit 75 is equal to or higher than the predetermined temperature, the lever 93 separates from the terminal 92 due to the electrostatic forces between the lever 93 and the gate electrode 94. Hence, it is possible to disconnect the connection between the input terminal 67 and the drive circuit 62 when an overcurrent flows into the driver IC 50, thereby preventing the driver IC 50 from overheating and starting on fire.

In the above explanation, the lever 93 is always connected to the terminal 91, and the lever 93 and the terminal 92 are in contact with each other during normal operation, but when an overcurrent flows into the driver IC 50, the lever 93 and the terminal 92 are separated from each other. Conversely, it may be possible to configure a structure where the lever 93 is always connected to the terminal 92, and the lever 93 and the terminal 91 are in contact with each other during normal operation, but when an overcurrent flows into the driver IC 50, the lever 93 and the terminal 91 are separated from each other.

Moreover, in the above explanation, although a flow of overcurrent in the driver IC 50 is detected based on the temperature of the driver IC 50, the present invention is not limited to this. For example, it may be possible to detect a flow of overcurrent in the driver IC 50 by other methods, such as by monitoring the value of a current flowing in any part of the driver IC 50. In this case, if the connection between the input terminal 67 and the drive circuit 62 is disconnected when a flow of overcurrent in the driver IC 50 is detected, the overcurrent does not further flow into the driver IC 50, thereby preventing the driver IC 50 from overheating and starting on fire.

Next, another embodiment will be explained. Here, the members having the same structures as in the above-mentioned embodiment will be designated by the same codes and the explanation thereof will be omitted suitably.

As shown in FIGS. 8A and 8B, like the switch 73 (see FIGS. 7A and 7B), a switch 101 comprises the terminals 91 and 92 and the lever 93. The switch 101 further comprises a junction layer 104 made of conducting material with a smaller thermal expansion coefficient than the lever 93, such as an alloy of Ni and Fe, and joined over the almost entire area of the upper surface of the extended section 93*b* of the lever 93; and a resistor 105 made of material with larger electrical resistance than the lever 93 and the junction layer 104, such as an alloy of Cu and Ni and an alloy of Ni and Cr, and joined to substantially the center of the upper surface of the junction layer 104. The terminal 91 is connected to the VDD2 line 55, and the terminal 92 is connected to the drive circuit 62 through the VDD2 line 55. Note that the gate electrode 94 (see FIGS. 7A and 7B), switch control circuit 74 and temperature detection circuit 75 described in the above embodiment are not provided.

In this case, when a current flows into the switch 101, the temperature of the resistor 105 having large resistance rises with an increase in the current value. Accordingly, the temperatures of the lever 93 and junction layer 104 also rise. As a result, the contact section 93*c* of the lever 93 is deformed in the direction away from the terminal 92 due to a difference in the thermal expansion coefficient between the lever 93 and the junction layer 104. The higher the temperatures of the lever 93, junction layer 104 and resistor 105, the larger the deformation of the lever 93. Therefore, during normal operation (when an overcurrent does not flow in the driver IC 50), the temperatures of the lever 93, junction layer 104 and resistor 105 are low and the terminal 92 and the lever 93 are in contact with each other (in the contact state) as shown FIG. 8A. On the other hand, when an overcurrent flows into the driver IC 50, the value of current flowing in the switch 101 is larger and the temperatures of the lever 93, junction layer 104 and resistor 105 rise. Then, when the lever 93, junction layer 104 and resistor 105 reach or exceed a predetermined temperature, the contact section 93*c* of the lever 93 separates from the terminal 92 and the connection between the terminal 91 and the terminal 92 is disconnected as shown in FIG. 8B, and power is not supplied to the drive circuit 62.

In this embodiment, the lever 93, junction layer 104 and resistor 105 are deformed according to the temperatures thereof, and when they reach or exceed a predetermined temperature, the lever 93 separates from the terminal 92. Hence, unlike the above-described embodiment, the switch control circuit 74 and temperature detection circuit 75 (see FIGS. 7A and 7B) are not required and complicated structures are not necessary, and it is possible to further reduce the size of the driver IC compared to the above-described embodiment, thereby providing more advantageous effects.

In the driver IC, the drive circuit, input terminal and mechanical switch are constructed as MEMS, and a thermal shutdown structure for disconnecting the connection between the drive circuit and the input terminal when an overcurrent flows is provided at some point of the VDD2 line for giving drive power to the drive circuit. Therefore, when an overcurrent flows, power is not supplied from the power source to the drive circuit. Consequently, since the overcurrent does not further flow into the drive circuit, it is possible to prevent the drive circuit from overheating and starting on fire, and it is possible to easily construct a small-size driver IC.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A driver device for driving an external device comprising:

a drive circuit which provides a driving potential to said external device;

an input terminal to which power for activating said drive circuit is supplied from a power source;

a mechanical switch connected to said drive circuit and said input terminal and capable of switching connection and disconnection between said drive circuit and said input terminal;

a switch control circuit for controlling the connection and disconnection operation of said mechanical switch; and a temperature detection circuit for detecting a temperature of said drive circuit, wherein said drive circuit, said input terminal, said mechanical switch, said switch control circuit, and said temperature detection circuit are constructed as MEMS, said mechanical switch switches from the connection to disconnection when an overcurrent flows into said drive circuit, and said switch control circuit controls said mechanical switch to switch from the connection to disconnection when the temperature detected by said temperature detection circuit is equal to or higher than a predetermined temperature.

2. The driver device according to claim 1, wherein said mechanical switch comprises:

a first terminal arranged on a surface of a substrate provided in MEMS and connected to said input terminal;

a second terminal arranged on the surface of said substrate and connected to said drive circuit;

a lever connected always to one of said first and second terminals and capable of selectively implementing either a contact state in which the lever comes into contact with the other to connect said drive circuit and said input terminal or a separated state in which the lever separates from the other to disconnect the connection between said drive circuit and said input terminal; and a gate electrode arranged on the surface of said substrate to face said lever with a space therebetween, wherein said switch control circuit outputs to said gate electrode a control signal according to the temperature detected by said temperature detection circuit, and said lever is deformed by electrostatic forces functioning between said lever and said gate electrode according to the control signal outputted to said gate electrode, and switches from the contact state to the separated state when a control signal corresponding to a temperature of said drive circuit equal to or higher than a predetermined temperature is outputted to said gate electrode.

3. A driver device for driving an external device comprising:

a drive circuit which provides a driving potential to said external device;

an input terminal to which power for activating said drive circuit is supplied from a power source;

a mechanical switch connected to said drive circuit and said input terminal and capable of switching connection and disconnection between said drive circuit and said input terminal, wherein said drive circuit, said input terminal and said mechanical switch are constructed as MEMS, said mechanical switch switches from the connection to disconnection when an overcurrent flows into said drive circuit, and said mechanical switch comprises:

a first terminal arranged on a surface of a substrate provided in MEMS and connected to said input terminal;

a second terminal arranged on the surface of said substrate and connected to said drive circuit;

an electrically conductive lever connected always to one of said first and second terminals and capable of selectively implementing either a contact state in which the lever comes into contact with the other to connect said drive circuit and said input terminal or a separated state in which the lever separates from the other to disconnect the connection between said drive circuit and said input terminal;

an electrically conductive junction layer provided on a surface of said lever and made of material with a thermal expansion coefficient different from said lever; and a resistor having larger electrical resistance than said lever and said junction layer and arranged on a surface of said junction layer, wherein said lever is deformed according to a temperature of said resistor due to a difference in the thermal expansion coefficient between said lever and said junction layer, and switches from the contact state to the separated state when said resistor equals or exceeds a predetermined temperature.

4. A liquid droplet ejection head comprising the driver device according to claim 1, wherein the liquid droplet ejection head comprises:

a channel unit having liquid channels comprising a plurality of nozzles for ejecting liquid droplets and a plurality of pressure chambers connected to said nozzles; and a piezoelectric actuator, which is provided as the external device, comprising a piezoelectric layer provided on a surface of said channel unit to cover said plurality of pressure chambers and a plurality of drive electrodes formed on a surface of said piezoelectric layer to correspond to said plurality of pressure chambers, for giving pressure for ejection to the liquid in said pressure chambers, wherein said driver device is mounted on an opposite surface of said piezoelectric layer to said pressure chambers, for driving said piezoelectric actuator, and wherein the drive circuit is connected to said plurality of drive electrodes, for giving a driving potential for driving said piezoelectric actuator to said plurality of drive electrodes.

5. A liquid droplet ejection head comprising the driver device according to claim 3, wherein the liquid droplet ejection head comprises:

a channel unit having liquid channels comprising a plurality of nozzles for ejecting liquid droplets and a plurality of pressure chambers connected to said nozzles; and a piezoelectric actuator, which is provided as the external device, comprising a piezoelectric layer provided on a surface of said channel unit to cover said plurality of pressure chambers and a plurality of drive electrodes formed on a surface of said piezoelectric layer to correspond to said plurality of pressure chambers, for giving pressure for ejection to the liquid in said pressure chambers, wherein the driver device is mounted on an opposite surface of said piezoelectric layer to said pressure chambers, for driving said piezoelectric actuator, and wherein the drive circuit is connected to said plurality of drive electrodes, for giving a driving potential for driving said piezoelectric actuator to said plurality of drive electrodes.

* * * * *